United States Patent
Kubo et al.

(10) Patent No.: US 7,971,672 B2
(45) Date of Patent: Jul. 5, 2011

(54) MOTORCYCLE

(75) Inventors: Shouichi Kubo, Shizuoka (JP);
Masahiro Noda, Shizuoka (JP);
Hidenori Satake, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 358 days.

(21) Appl. No.: 12/093,136

(22) PCT Filed: Nov. 17, 2006

(86) PCT No.: PCT/JP2006/322950
§ 371 (c)(1),
(2), (4) Date: Jan. 14, 2009

(87) PCT Pub. No.: WO2007/058295
PCT Pub. Date: May 24, 2007

(65) Prior Publication Data
US 2009/0194354 A1   Aug. 6, 2009

(30) Foreign Application Priority Data
Nov. 17, 2005   (JP) ................................. 2005-332348

(51) Int. Cl.
*B62D 61/02* (2006.01)
*B62K 11/00* (2006.01)
(52) U.S. Cl. ....................... 180/219; 180/227
(58) Field of Classification Search .................. 180/219, 180/227, 228, 230
See application file for complete search history.

(56) References Cited

U.S. PATENT DOCUMENTS

| 3,783,961 | A | * | 1/1974 | Hooper | 180/228 |
| 4,427,087 | A | * | 1/1984 | Inoue et al. | 180/219 |
| 5,390,758 | A | * | 2/1995 | Hunter et al. | 180/228 |
| 6,024,185 | A | * | 2/2000 | Okada et al. | 180/227 |
| 6,845,836 | B2 | * | 1/2005 | Inaoka et al. | 180/228 |
| 7,159,885 | B2 | * | 1/2007 | Toyoda et al. | 280/284 |
| 7,364,001 | B2 | * | 4/2008 | Inaoka et al. | 180/228 |
| 7,478,696 | B2 | * | 1/2009 | Ishida et al. | 180/219 |
| 7,523,800 | B2 | * | 4/2009 | Shinsho et al. | 180/219 |
| 2004/0007409 | A1 | * | 1/2004 | Keller et al. | 180/228 |
| 2006/0037800 | A1 | * | 2/2006 | Kawase | 180/219 |
| 2006/0065456 | A1 | * | 3/2006 | Noda | 180/219 |

(Continued)

FOREIGN PATENT DOCUMENTS

JP   01-106788   4/1989

(Continued)

OTHER PUBLICATIONS

European search report for corresponding European application 06832829 lists the references above.

*Primary Examiner* — Kevin Hurley
*Assistant Examiner* — Marc A Scharich
(74) *Attorney, Agent, or Firm* — Keating & Bennett, LLP

(57) ABSTRACT

A motorcycle including a body frame 1 and an engine 20 mounted to the body frame 1, wherein the body frame 1 includes: left and right frame members (tank rails) 3 and 3 provided on one and the other sides in the vehicle width direction; a cross member 50 for connecting the left and right frame members with each other; and a bracket 53 provided into one body with the cross member 50, wherein a cylinder part (a cylinder head) 24 of the engine 20 is directly mounted to the bracket 53.

12 Claims, 10 Drawing Sheets

U.S. PATENT DOCUMENTS

2007/0216132 A1 * 9/2007 Ozawa .................. 280/304.5

FOREIGN PATENT DOCUMENTS

| | | |
|---|---|---|
| JP | 03-125684 | 5/1991 |
| JP | 03-193584 | 8/1991 |
| JP | 03231089 A | 10/1991 |
| JP | 04-212685 | 8/1992 |
| JP | 05050969 A | 3/1993 |
| JP | 06-088548 | 11/1994 |
| JP | 10-100976 | 4/1998 |
| JP | 11-059551 | 3/1999 |
| JP | 2003-072649 | 3/2003 |
| JP | 2005-120875 | 5/2005 |

* cited by examiner

MOTORCYCLE

RELATED APPLICATIONS

This application is a U.S. national phase application of PCT/JP2006/322950, filed on Nov. 17, 2006, and claims the benefit of priority under 35 USC 119 of Japanese patent application no. 2005-332348, filed on Nov. 17, 2005, which applications are hereby incorporated by reference in their entireties.

BACKGROUND OF THE INVENTION

1. Field of the Invention

The invention relates to a motorcycle comprising a body frame and an engine mounted to the body frame.

2. Description of Related Art

In a motorcycle, to improve the engine supporting rigidity of a body frame, an engine may be mounted in a space enclosed by left and right tank rails and left and right down tubes, and may be fixed to the left and right tank rails and down tubes through a separate bracket (refer to Japanese Patent No. 2,903,231, for example).

In a conventional motorcycle, the left and right tank rails and down tubes are used for supporting an engine. This causes a problem in that the number of components and the weight of the vehicle body increase, although supporting rigidity can be secured.

In order to solve such a problem, removal of the down tubes may be considered. When the down tubes are removed in a conventional structure in which left and right tank rails support the engine through a separate bracket, however, the rigidity in supporting the engine is likely to be deteriorated.

SUMMARY OF THE INVENTION

In view of the above, the invention provides a motorcycle with a reduced number of components and vehicle body weight, while achieving the necessary rigidity in supporting an engine.

The invention is a motorcycle including a body frame and an engine mounted to the body frame. The body frame comprises left and right frame members in the vehicle width direction; a cross member connecting the left and right frame members; and a bracket provided into one body with the cross member. A cylinder part of the engine is directly mounted to the bracket.

In the invention, the cylinder part is a collective term for a cylinder block, a cylinder head and a head cover. Further, integrating a bracket with a cross member means forming a bracket into one body with a cross member by welding, casting, pressing, forging or the like.

In accordance with the motorcycle according to the invention, a bracket is integrated with a cross member for connecting left and right frame members and a cylinder part of an engine is directly mounted to the bracket, so that a body frame directly supports an upper part of the engine and necessary rigidity in supporting the engine is secured. This allows the down tubes to be removed, and thereby, the number of components and the weight of the vehicle body is reduced.

DETAILED DESCRIPTION OF THE INVENTION

Figure 1:
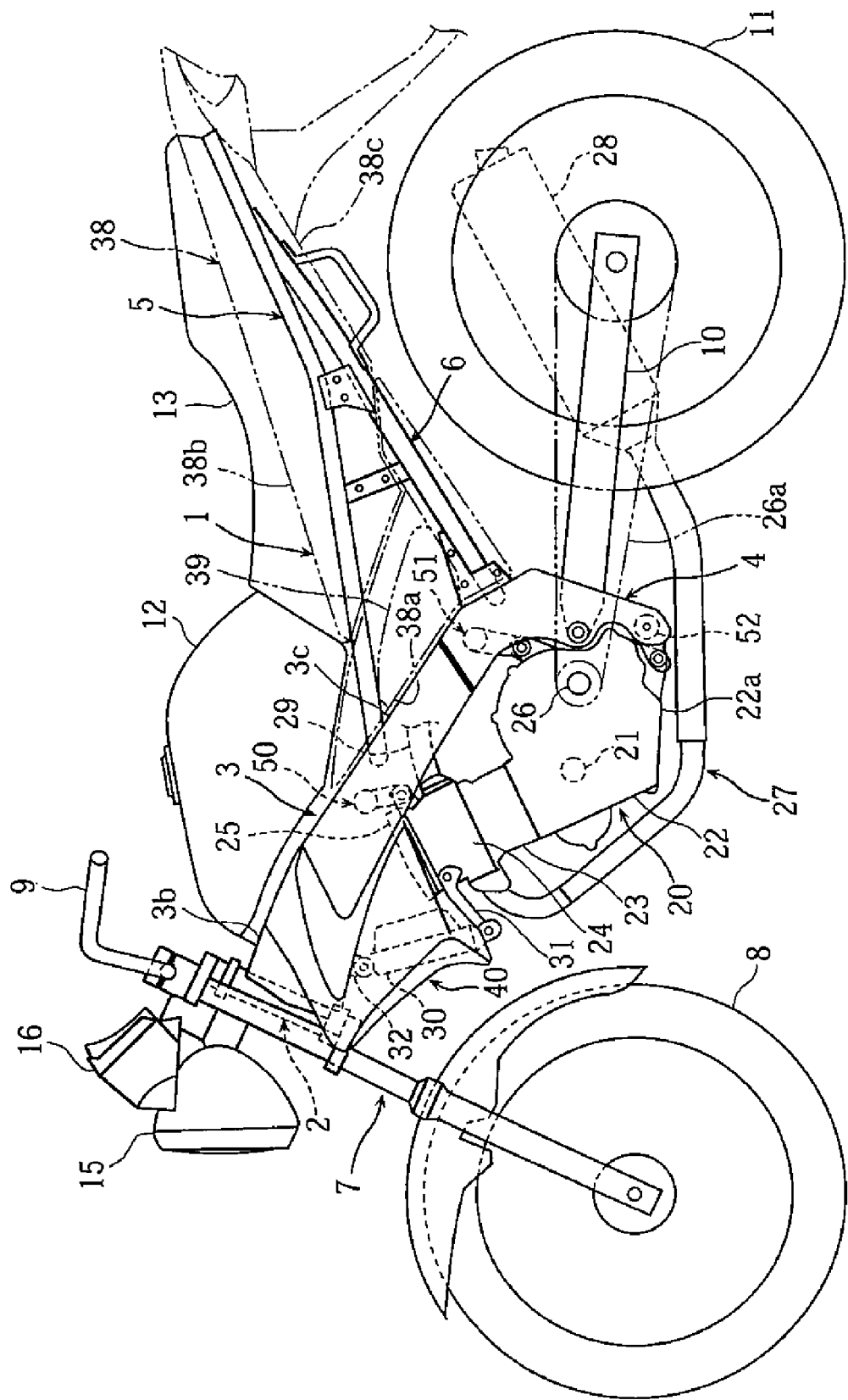
FIG. 1 is a side view of a motorcycle in accordance with an embodiment of the invention.
Figure 2:
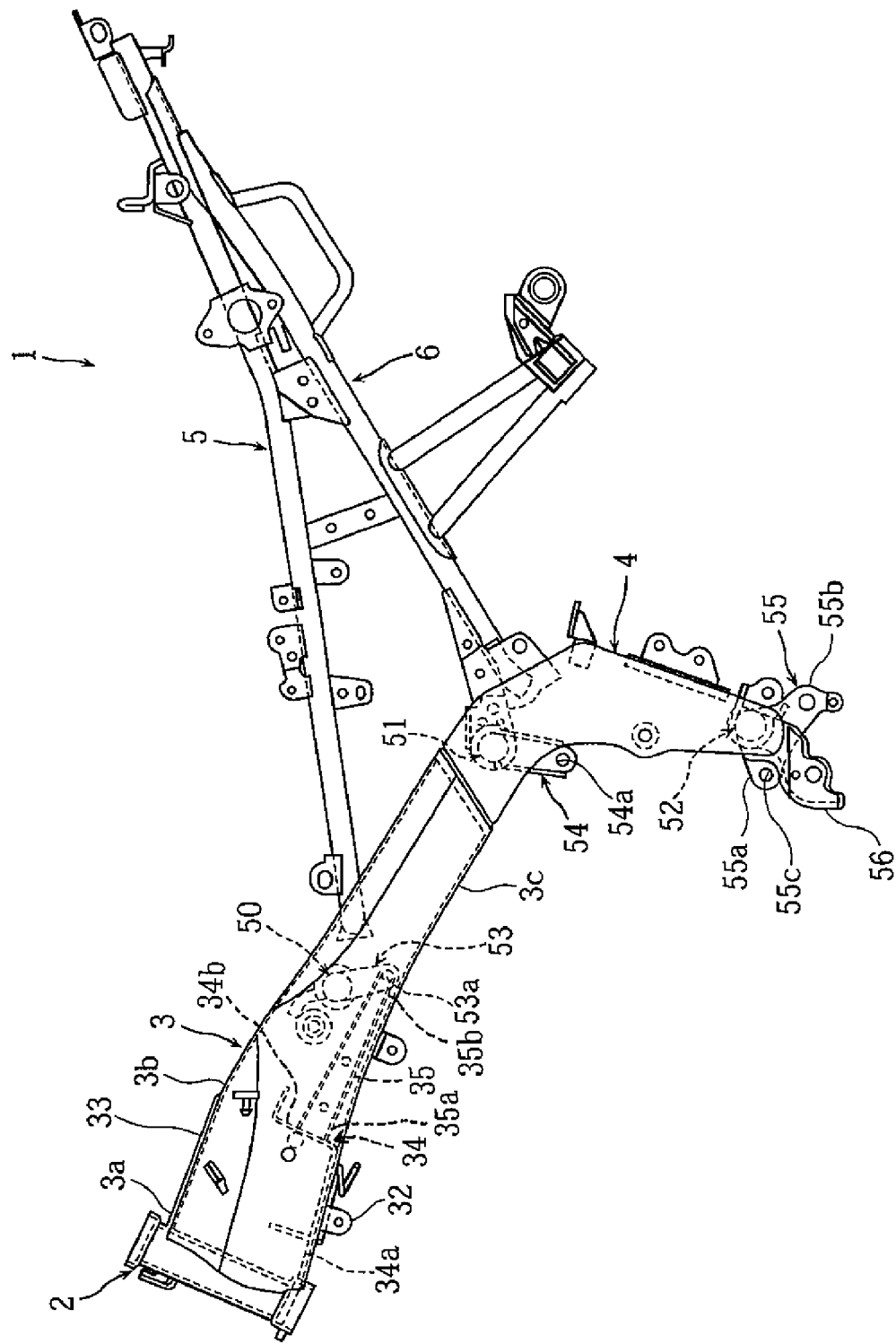
FIG. 2 is a side view of a body frame of the motorcycle.
Figure 3:
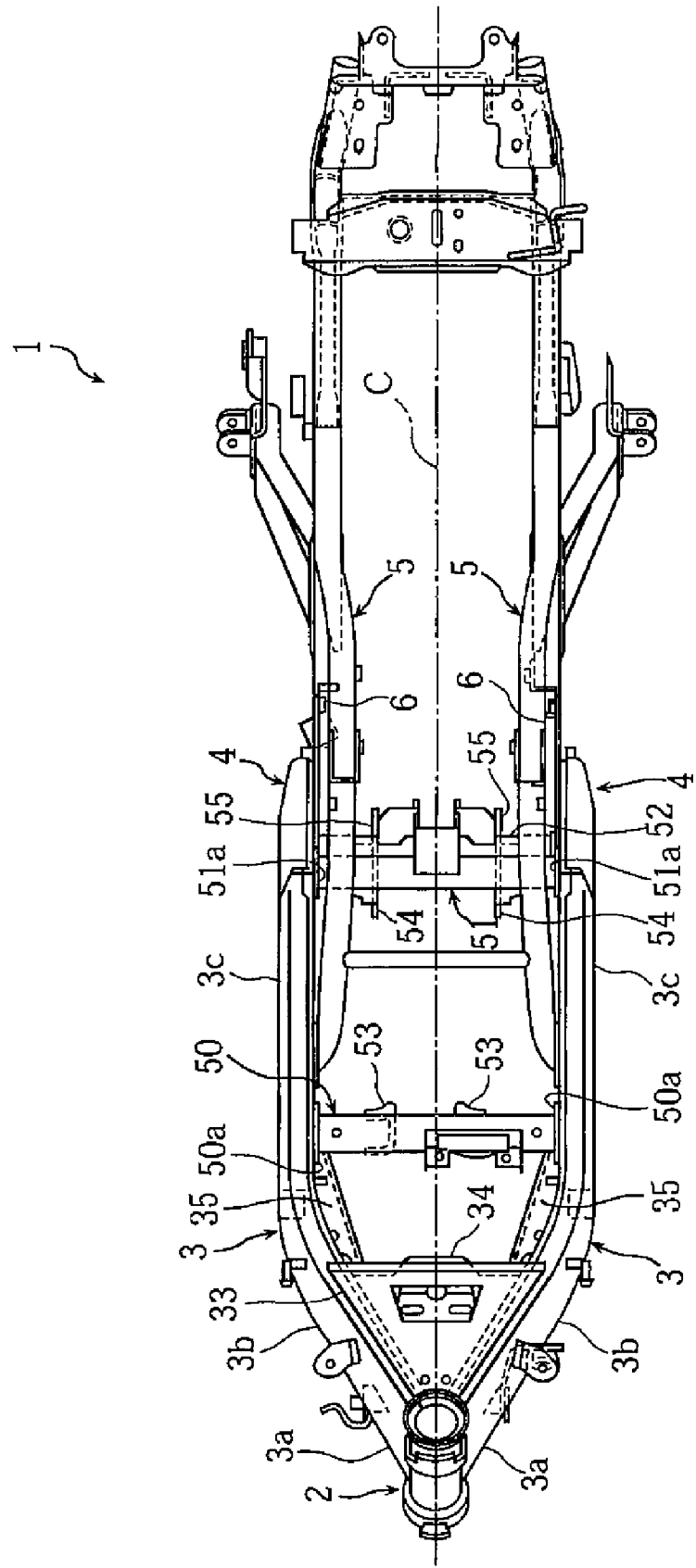
FIG. 3 is a plan view of the body frame.

An embodiment of the invention will be described hereinafter on the basis of the attached drawings.

FIGS. 1 to 7 illustrate a motorcycle in accordance with an embodiment of the invention. Front, rear, left and right in this description are directions from the perspective of a person sitting on a seat. Upper and lower parts in this description are upper and lower parts relative to a direction vertical to a road surface.

In the drawings, 1 denotes a body frame of a motorcycle. The body frame 1 comprises a head pipe 2, left and right tank rails (frame members) 3 extending obliquely downward from the head pipe 2 toward the rear of the vehicle, rear arm brackets 4 extending downward from rear ends of the tank rails 3, left and right seat rails 5 extending obliquely upward from the tank rails 3 toward the rear of the vehicle and left and right seat stays 6 bridged between rear parts of the seat rails 5 and the rear arm brackets 4.

The head pipe 2 holds a front fork 7 so that the front fork 7 can be steered left and right. A front wheel 8 is rotatably held at the lower end of the front fork 7. A steering handle 9 is mounted on the upper end. A headlight 15 is provided on the front side of the head pipe 2. A meter device 16 such as a speedometer is provided at the upper part of the headlight 15.

The left and right rear arm brackets 4 hold the front end part of a rear arm 10 so that the rear arm 10 can vertically swing. The rear end part of the rear arm 10 rotatably holds the rear wheel 11.

A fuel tank 12 is mounted on the left and right tank rails 3. A double seat 13 is mounted on the left and right seat rails 5.

A water-cooling type engine 20 is mounted under the left and right tank rails 3. The engine 20 comprises a cylinder block 23, a cylinder head 24 and head cover 25 piled on the upper mating surface of a crank case 22 in which a crank shaft 21 is housed, and a bolt is fastened in the piled components for connection.

A transmission case 22a for having a change gear (not shown) built in is formed into one body with the crank case 22 at the rear part of the crank case 22. The rear wheel 11 is driven for rotation through a chain 26a by a drive shaft 26 provided on the rear part of the transmission case 22a.

A front wall part of the cylinder head 24 is connected to an exhaust pipe 27. The exhaust pipe 27 extends downward from the front wall part to pass under the engine 20 toward the rear part of the vehicle. The exhaust pipe 27 is connected to a muffler 28 provided on the right side of the rear wheel 11.

A rear wall part of the cylinder head 24 is connected to an intake pipe 29. The intake pipe 29 extends rearward under the fuel tank 12 to be connected to an air cleaner (not shown).

A radiator 30 is provided on the upper-front part of the engine 20. Left and right upper wall parts of the radiator 30 are fixed to radiator brackets 32 mounted to the lower surface of the left and right tank rails 3 by fastening a bolt. A lower end part on the left side is fixed to the cylinder head 24 through the arm bracket 31 by fastening a bolt.

The left and right seat rails 5 and the seat stays 6 are covered with left and right side covers 38 made of resin. The side covers 38 are substantially in the shape of a reverse triangle in which a front edge 38a extends along the upper surface of the tank rail 3, an upper edge 38b extends along the lower edge parts of the fuel tank 12 and the seat 13 and a lower edge 38c extends along the seat stay 6 in a side view of the vehicle.

Front covers 40 made of resin are provided on the outer sides of the left and right tank rails 3. Front covers 40 function as an air scoop for introducing running wind into the radiator 30.

Tank rails 3 are formed from welded plural metal plates and have a cross section in the shape of a rectangle whose dimension in the vertical direction is larger than in the width direction. Tank rails 3 gradually become larger in dimension in the vertical direction from the rear side to the front side. The height of the front end parts 3a of tank rails 3 in the vertical direction is substantially equal to the height of the head pipe 2 in the axial direction. This allows the strength in connection between tank rails 3 and the head pipe 2 and the rigidity to be improved, so that endurance against a large bending moment operating on the connecting part between the head pipe 2 and tank rails 3 can be achieved.

Tank rails 3 include inside inclined parts 3b having an interval therebetween that widens in the vehicle width direction from the head pipe 2 toward the rear part of the vehicle in a plan view, and straight line parts 3c extending substantially straight from rear ends of the inside inclined parts 3b to the rear part of the vehicle. The front end parts 3a of inside inclined parts 3b and 3b are welded to the head pipe 2 for bonding. An interior angle of inside inclined parts 3b and 3b is set at around 60 degrees.

Upper and lower gussets 33 and 34, which are in the shape of a triangle in plan view, are welded for bonding on the upper and lower sides of the left and right inside inclined parts 3b and 3b. The gussets function as a reinforcing member. The upper gusset 33 is a flat plate. The lower gusset 34 includes a flat bottom wall 34a and a vertical wall 34b rising upward from a rear edge of the bottom wall 34a. A resonator chamber for secondary air (not shown) is provided in a space enclosed by the head pipe 2 and the upper and lower gussets 33 and 34.

A lateral gusset 35 functioning as a reinforcing member is provided on inner wall surfaces of the left and right tank rails 3. The lateral gusset 35 is in the shape of a bar having a U-shaped horizontal cross-section. The lateral gusset 35 extends from the rear part of the inside inclined parts 3b of tank rails 3 to the vicinity of the front end part of the straight part 3c in an axial direction of tank rails 3 and in a direction away from the head pipe 2. Opening edges of the U-shaped lateral gusset 35 are welded on the inner wall surfaces of the tank rails 3. The front end part 35a is welded to the vertical wall 34b of the lower gusset 34 for bonding.

A reservoir tank 36 for supplying the radiator 30 with cooling water is provided on a front side part of a middle cross member 51, which is provided between the left and right tank rails 3 and is mentioned later. The reservoir tank 36 is offset to the left with respect to a center line of the vehicle body C so as to be provided along the inside of the left tank rail 3 (refer to FIG. 7). Removing a maintenance cover 39 detachably mounted to the side cover 38 allows the reservoir tank 36 to be supplied with cooling water (refer to FIG. 1).

The engine 20 is directly mounted to pairs of left and right front, middle and lower brackets 53, 54 and 55, which are provided into one body with cylindrical front, middle and lower cross members 50, 51 and 52 connecting the left and right tank rails 3 and the left and right rear arm brackets 4 and which are made of sheet metal. A detailed structure of the engine 20 is as follows.

The front cross member 50 is provided between the inner walls of the front end parts of the straight parts 3c of tank rails 3. Flange parts 50a formed on the left and right end parts of the front cross member 50 are welded to the inner walls for bonding. The flange parts 50a are located over the rear end part 35b of the lateral gusset 35. That is, the front cross member 50 and the lateral gusset 35 are provided within a dimension in the height direction of tank rails 3 so as to be different in location in the height direction.

A pair of left and right front brackets 53 is welded to the front cross member 50 into one body for bonding with predetermined intervals in the vehicle width direction. The front brackets 53 are located within planes of shadows of tank rails 3 in a side view of the vehicle so as not to be in sight from the outside.

The front brackets 53 include belt-shaped supporting parts 53b extending downward from the cross member 50 so as to be a little bit inclined rearward and front and rear flange parts 53c formed by bending outside in the vehicle width direction from the top end of the supporting part 53b. The flange parts 53c are welded to the front cross member 50. A bolt hole 53a is formed at the lower end part of the supporting part 53b. The flange part 53c can be extended to the lower end part of the supporting part 53b, of course. Contrary to the above, it is also possible to adopt a structure of providing only the supporting part 53b without providing the flange parts 53c.

Figure 4:
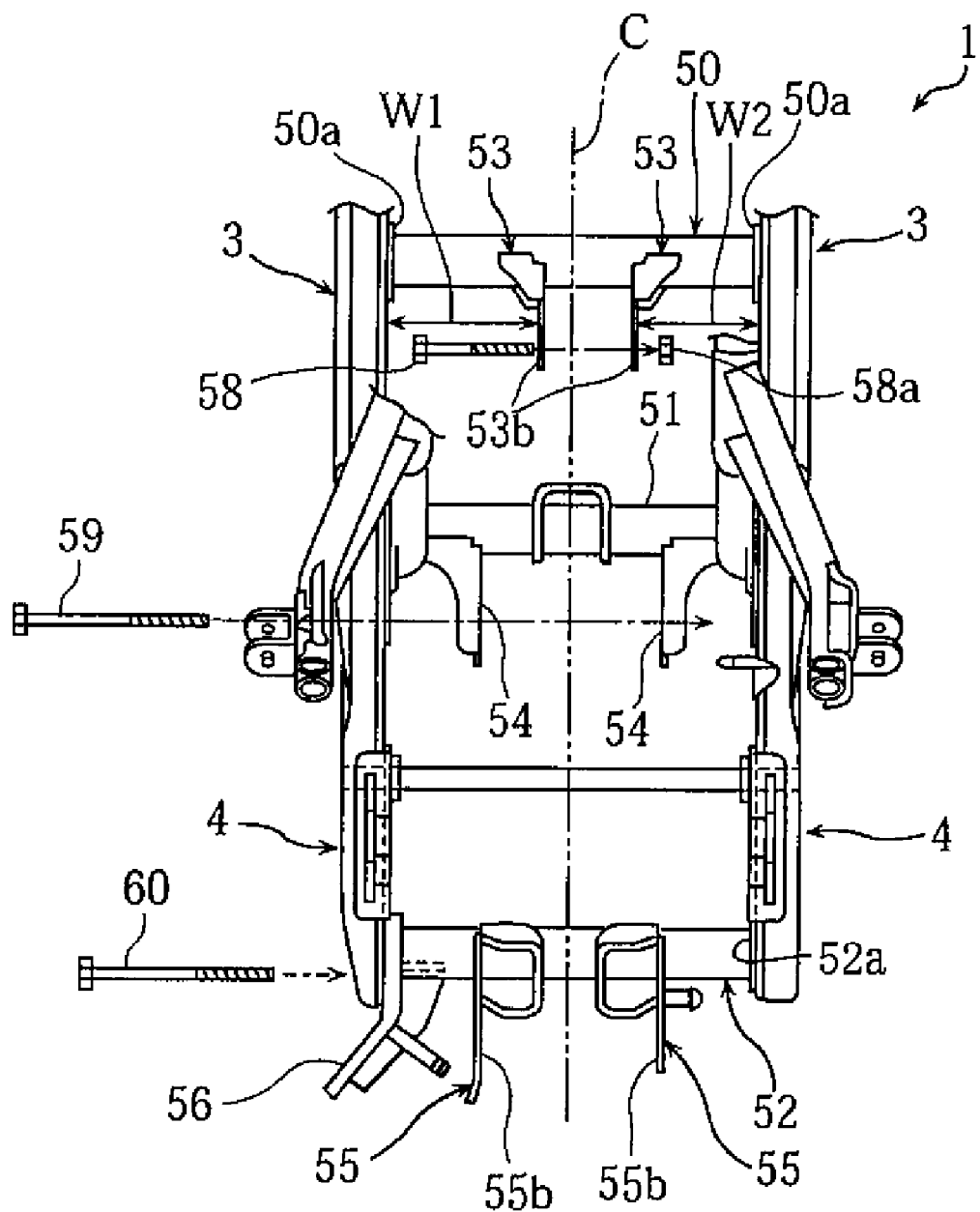
FIG. 4 is a back view of the body frame.
Figure 5:
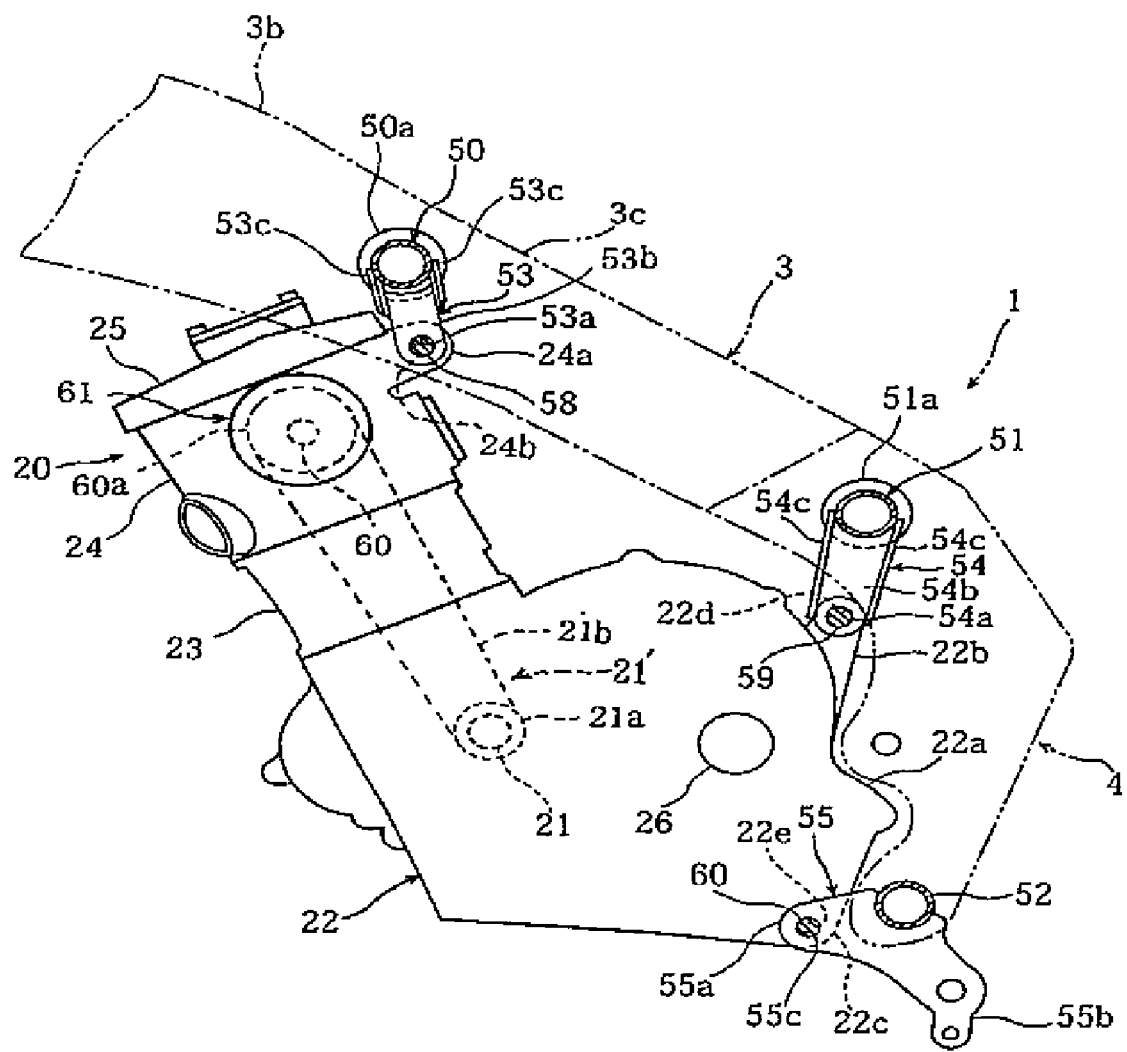
FIG. 5 is a side view of an engine mounted to the body frame.
Figure 6:
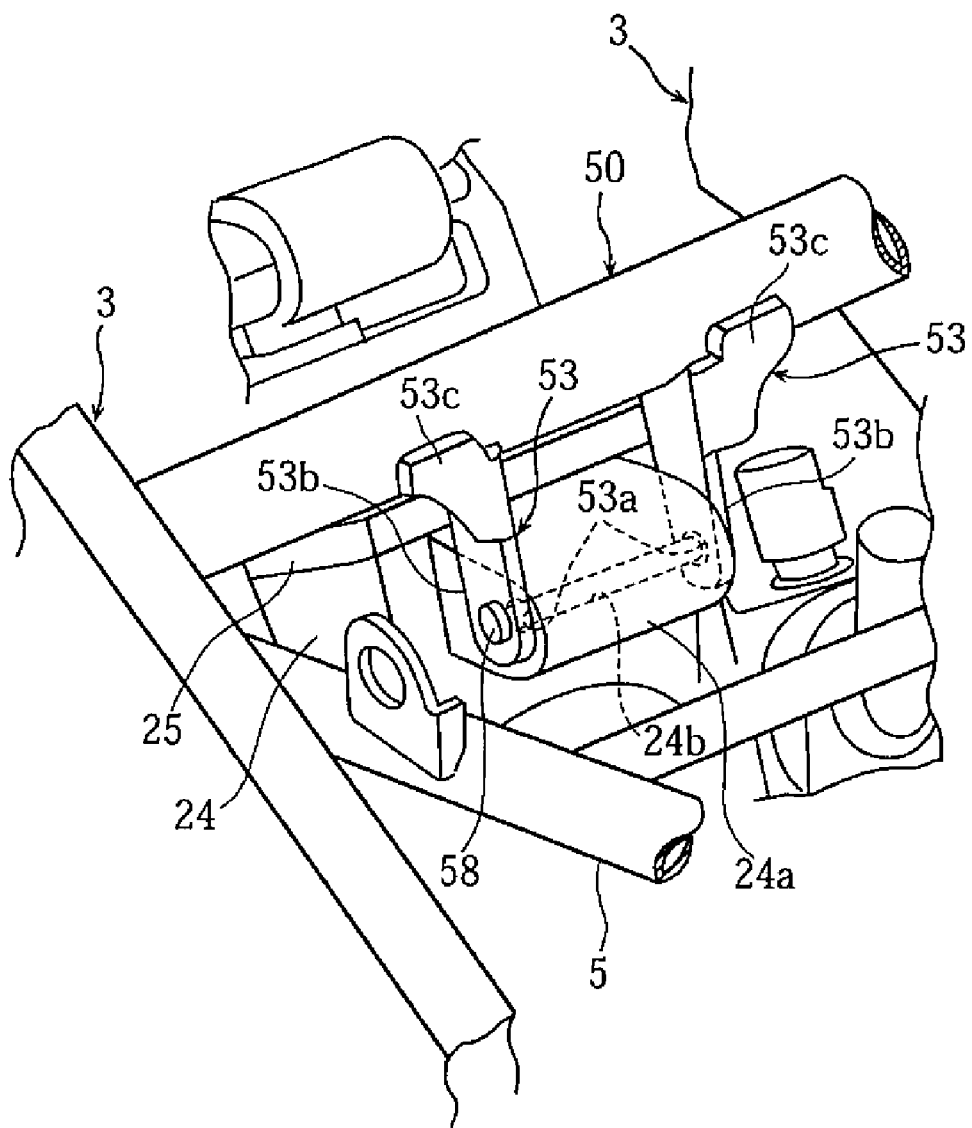
FIG. 6 is a perspective view of a mounting part of the engine.
Figure 7:
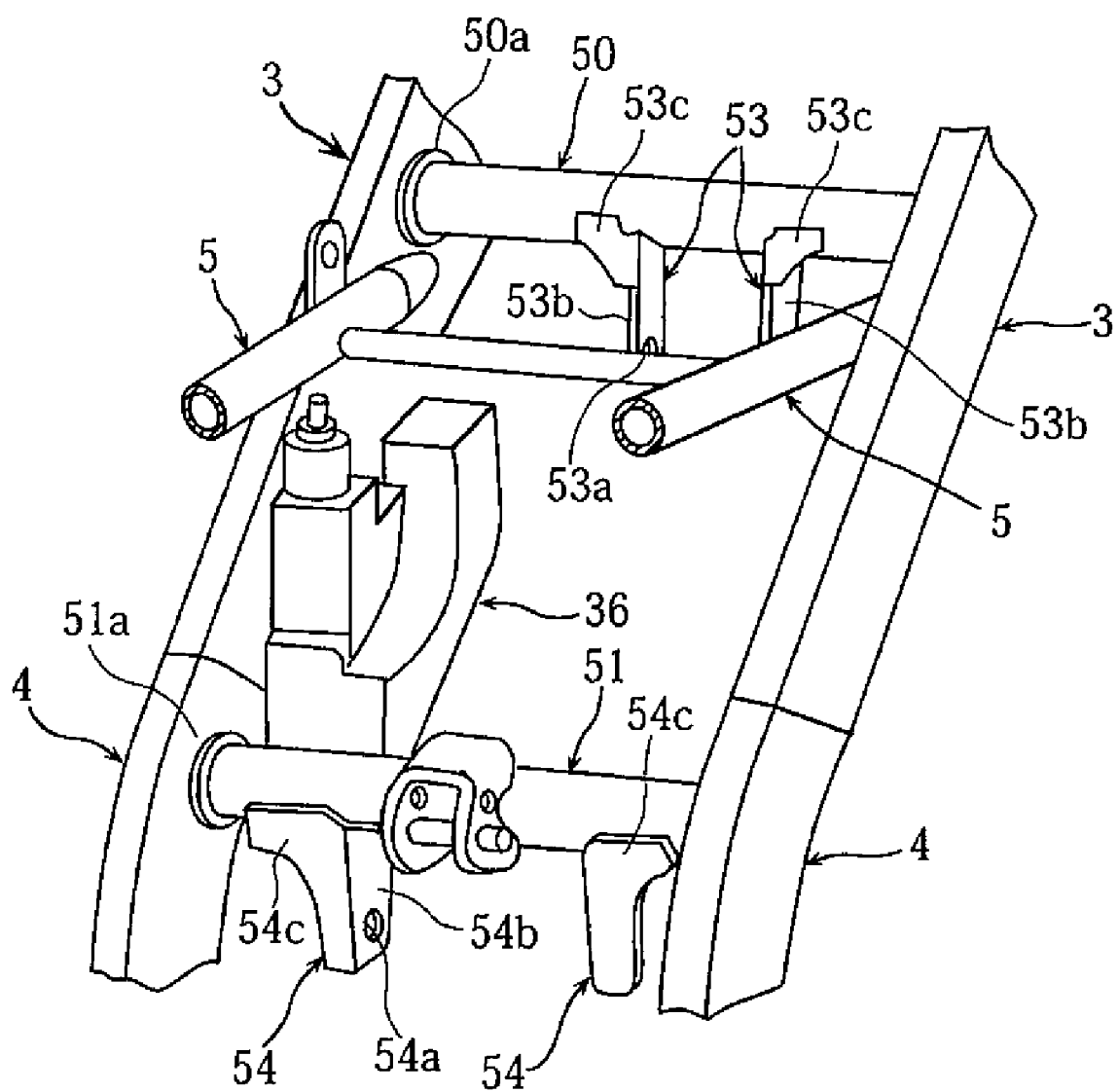
FIG. 7 is a perspective view of the body frame.
Figure 8:
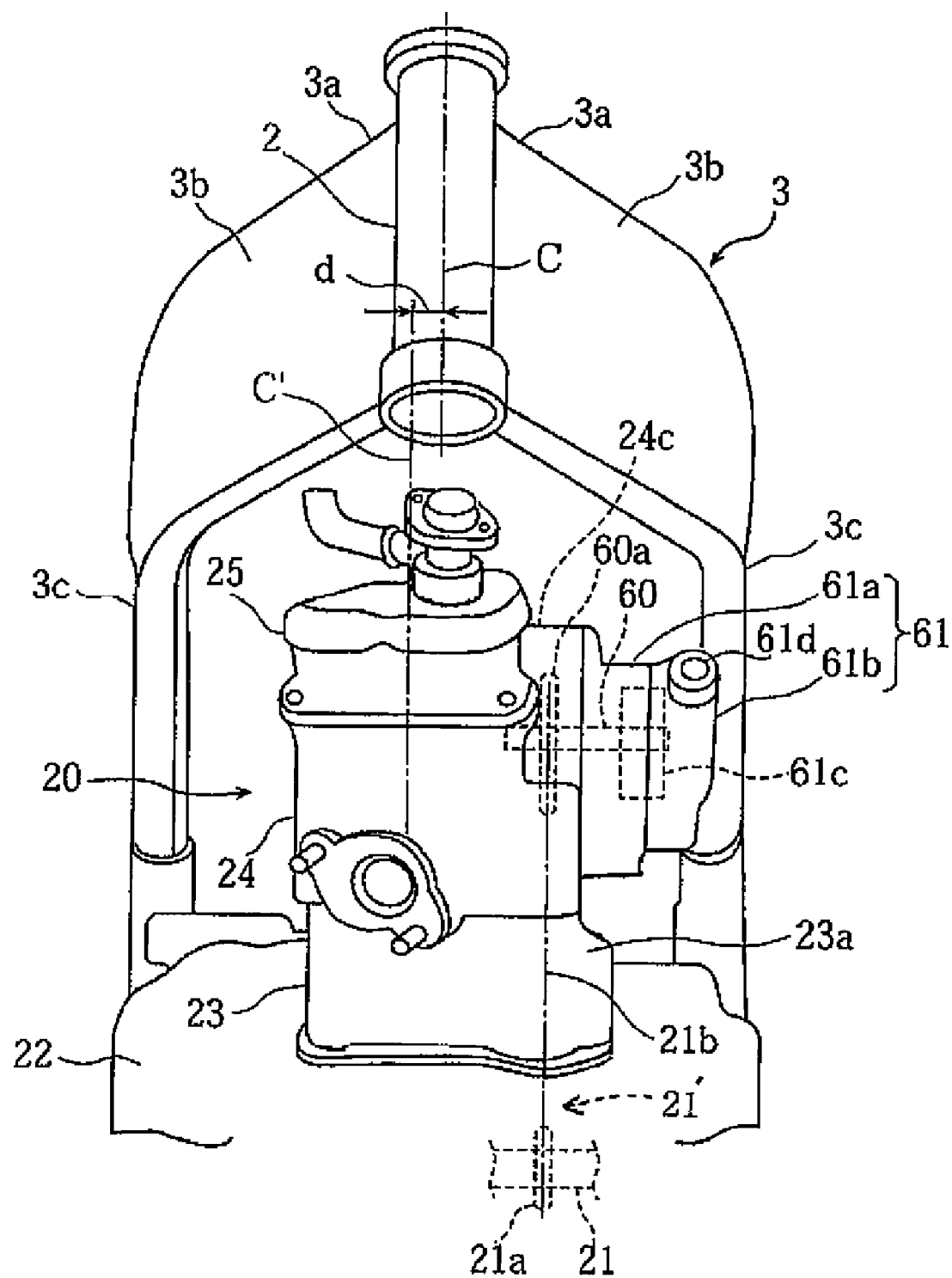
FIG. 8 is a front view of an engine mounted to the body frame.
Figure 9:
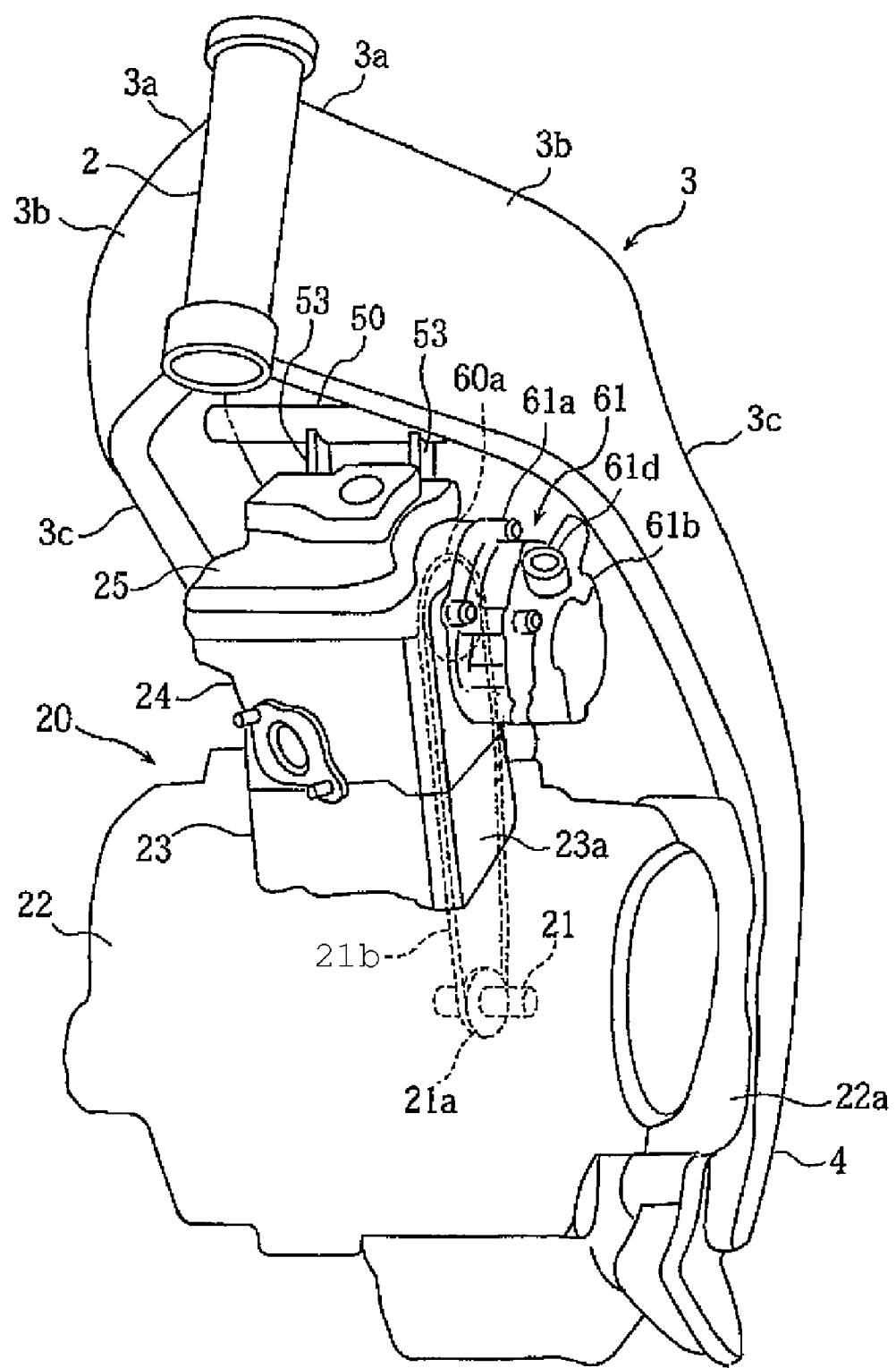
FIG. 9 is a front perspective view of an engine mounted to the body frame.
Figure 10:
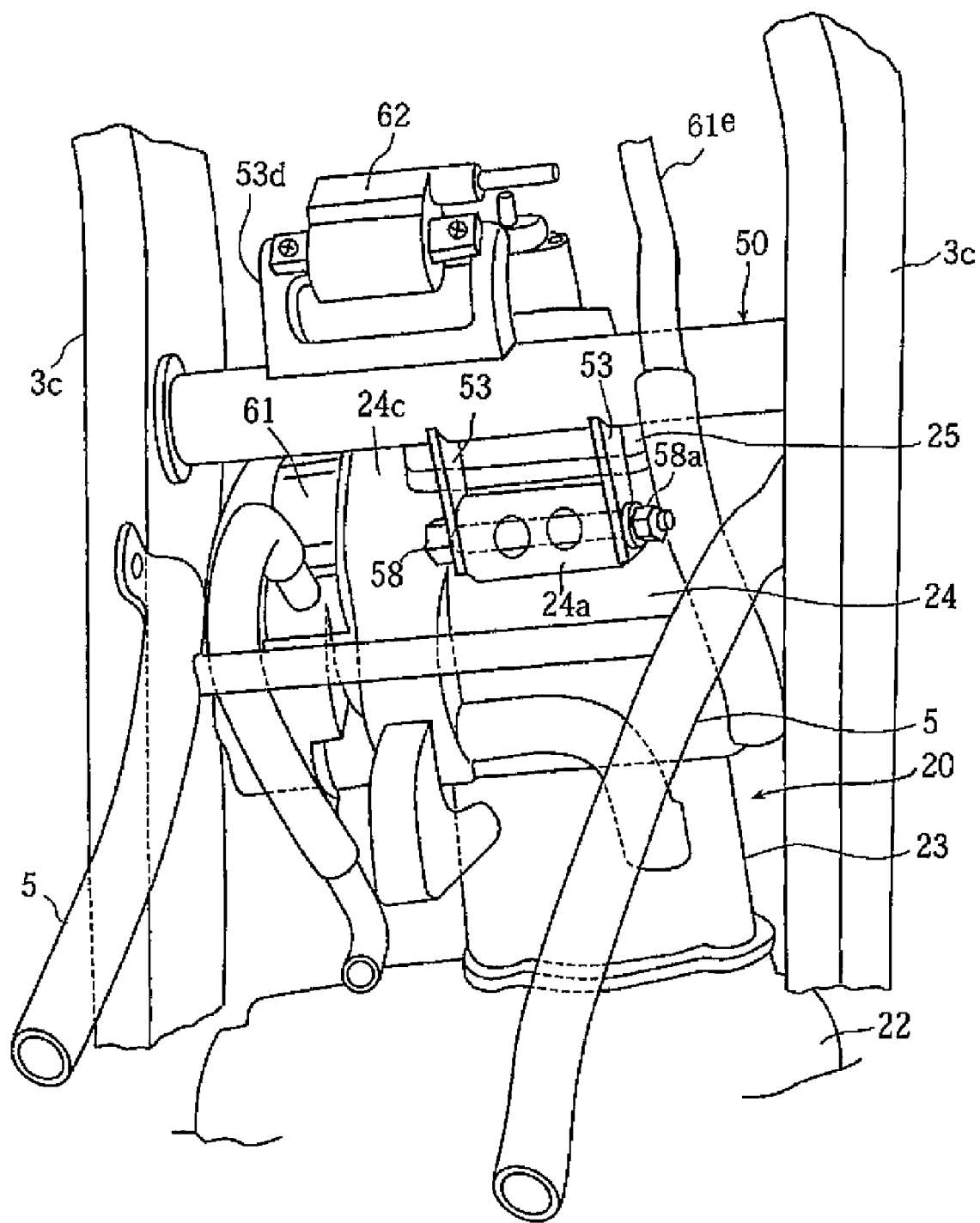
FIG. 10 is a plan perspective view of an engine mounted to the body frame.

As shown in FIG. 4, an interval w1 between the left tank rail 3 and the front-left bracket 53 is set to be larger than an interval w2 between the right tank rail 3 and the supporting part 53b of the front-right bracket 53. In other words, the left and right front brackets 53 are offset to the right in the vehicle width direction with respect to the center line of the vehicle body C. This allows efficiency in operation of mounting the engine 20 to the vehicle to be improved as described later.

The middle cross member 51 is provided between the inner walls of the top end parts of the left and right rear arm brackets 4. The flange parts 51a formed on the left and right end parts of the middle cross member 51 are bonded to the inner walls by welding.

The pair of left and right middle brackets 54 are bonded by welding into one body with the middle cross member 51 with a predetermined intervals in the vehicle width direction so as to be symmetrical with respect to the center line of the vehicle body C. The left and right middle brackets 54 include belt-shaped supporting parts 54b extending downward from the middle cross member 51 so as to be a little bit inclined frontward and flange parts 54c formed by bending outside in the vehicle width direction from the supporting parts. The top ends of the flange parts 54c are welded to the middle cross member 51. A bolt hole 54a is formed at the lower end part of the supporting part 54b. The bolt hole 54a is located at a forward part of a front edge part of the rear arm bracket 4 in a side view of the vehicle.

A lower cross member 52 is arranged between the inner walls of the lower end parts of the left and right rear arm brackets 4. A side stand bracket 56 is provided at the left end part of the lower cross member 52. A flange part 52a is formed on the right end bracket. The flange part 52a and the side stand bracket 56 are inserted at the lower end parts of rear arm brackets 4 to be welded for fixing. A pair of left and right lower brackets 55 is welded for bonding into one body with the lower cross member 52 with a predetermined interval in the vehicle width direction.

The lower brackets 55 include suspension parts 55a projecting forward from the lower ends of the rear arm brackets 4 and center stand supporting parts 55b projecting downward. The left and right suspension parts 55a are provided with bolt holes 55c. The lower brackets 55 are symmetrical with respect to the center line of the vehicle body C.

An upper boss part 24a projecting rearward is formed into one body on the upper end part of a rear wall of the cylinder head 24, which is a component of the cylinder part of the engine 20. The upper boss part 24a and the rear end part of the head cover 25 are overlapped with the left and right tank rails 3 in a side view of the vehicle. The upper boss part 24a is provided with a bolt inserting hole 24b so that the bolt inserting hole 24b would be coaxial with the bolt holes 53a of the left and right front brackets 53.

The upper boss part 24a is provided between the left and right front brackets 53. Inserting a fastening bolt 58 into the bolt hole 53a, the bolt inserting hole 24b and the bolt hole 53a from the left side of the vehicle and fastening a nut 58a allow the upper boss part 24a to be directly fixed to front brackets 53. A wide operating space, which is formed according to widening of the interval w1 between the left tank rail 3 and the front-left bracket 53, is used for inserting the fastening bolt 58 into the bolt hole 53a. This prevents difficulty in efficiency in operation of mounting the engine 20 from occurring while the front brackets 53 are overlapped with tank rails 3.

As described above, the left and right front brackets 53 and the upper boss part 24a are shifted to one side from the center line of the vehicle body C (the right side in the embodiment) while the engine 20 is mounted so that a cylinder axis C' thereof would be shifted by an amount of "d" to the right side from the center line of the vehicle body C. This is likely to deteriorate the balance in weight in the vehicle width direction (to make the right side heavier than the left side). Accordingly, in the embodiment, components of an engine and components mounted to the vehicle are shifted to the other side (the left side in the embodiment) from the center line of the vehicle C so as to improve the balance in weight in the vehicle width direction, as shown in FIGS. 5 and 8 to 10.

Concretely, a cam shaft driving mechanism 21' and a cooling water pump 61, which are used as components of an engine, and an ignition coil 62 and a reservoir tank 36, which are used as components mounted to the vehicle, are provided so as to be shifted to the left side from the center line of the vehicle C.

The cam shaft driving mechanism 21' comprises a crank sprocket 21a formed at a left side part of the crank shaft 21, a cam sprocket 60a mounted to a left side part of the cam shaft 60 and a timing chain 21b wound around the both sprockets 60a and 21a. The cam shaft driving mechanism 21' passes through chain rooms 24c and 23a formed at left side parts of the cylinder head 24 and the cylinder block 23.

The cooling water pump 61 comprises a pump case 61a mounted to a left side wall of the cylinder head 24, a pump cover 61b mounted to a left end opening of the case and an impeller 61c provided in the pump case 61a and the pump cover 61b. The impeller 61c is mounted at a left end of the cam shaft 60 coaxially with the cam sprocket 60a.

Cooling water for an engine is sucked from the radiator 30 into the cooling water pump 61 through an intake 61d to be supplied to a cooling jacket in the cylinder head 24, and then, further sent to the radiator 30 through a cooling water hose 61e to be sucked again into the cooling water pump 61.

The ignition coil 62 is detachably mounted to a bracket 53d fixed on the front side of the cross member.

A middle boss part 22b projecting upward is formed into one body on a rear wall of the transmission case 22a of the crank case 22. The middle boss part 22b is provided between the left and right middle brackets 54. The middle boss part 22b is provided with a bolt inserting hole 22d that is substantially coaxial with the bolt hole 54a. The middle boss part 22b is directly fixed to middle brackets 54 by fastening bolt 59 inserted from the outside in the vehicle width direction.

A lower boss part 22c projecting rearward is formed into one body at a lower end part of a rear wall of the transmission case 22a. The lower boss part 22c is provided between the suspension parts 55a of lower brackets 55. The lower boss part 22c is provided with a bolt inserting hole 22e that is substantially coaxial with the bolt hole 55a. The lower boss part 22c is directly fixed to suspension parts 55a by a fastening bolt 60 inserted from the outside in the vehicle width direction.

The middle bracket 54 and the suspension part 55a of the lower bracket 55 are exposed outside from the rear arm bracket 4 in a side view of the vehicle. Accordingly, an operation of inserting the fastening bolts 59 and 60 can be easily performed.

As described above, in the engine 20, the upper end part, the middle part and the lower end part of the rear side wall of the engine 20 are directly fixed to the body frame 1, respectively.

In accordance with the invention, the front brackets 53 are welded into one body with the front cross member 50 connecting the left and right tank rails 3 to each other and the cylinder head 24 forming a cylinder part of the engine 20 is directly mounted to the front brackets 53. This allows the supporting rigidity necessary for the engine 20 to be secured.

In the embodiment, the upper part and the lower part of the crank case 22 of the engine 20 are directly mounted to the pair of left and right middle and lower brackets 54 and 55 provided into one body with the middle and lower cross members 51 and 52 connecting the left and right rear arm brackets 4 to each other. Accordingly, the supporting rigidity of a whole engine 20 can be secured. This allows a down tube to be omitted, and thereby, the number of components and the weight of the vehicle body to be reduced.

In the embodiment, the upper end part of the cylinder head 24 forming the cylinder part is directly mounted to the body frame 1, so that the distance from a case suspension part can be large. This allows the supporting rigidity to be further improved.

The upper boss part 24a, which is to be mounted to the front bracket 53, is formed into one body with the cylinder head 24 to be overlapped with the left and right tank rails 3 in a side view of the vehicle. This allows the front bracket 53 to be short, so that the bending moment operating on the bracket can be smaller than the case that the front bracket is long. Further, the upper boss part 24a can be covered up by means of the tank rail 3, and thereby, a clear-cut appearance can be achieved.

In the embodiment, the interval w1 between the left tank rail 3 and the front-left bracket 53 is set to be larger than the interval w2 between the right tank rail 3 and the front-right bracket 53. This allows a space for operation in inserting the fastening bolt 58 into the upper boss part 24a overlapped with the tank rail 3 in the width direction to be secured.

Further, the balance in weight in the vehicle width direction is likely to be deteriorated (the right side is likely to be heavier) since the left and right front brackets 53 are shifted to the right side in the vehicle width direction from the center line of the vehicle body C in the embodiment. The balance in weight, however, can be improved by means of the cam shaft driving mechanism 21' and the cooling water pump 61, which are used as components of an engine, provided so as to be shifted to the left side in the vehicle width direction from the center line of the vehicle body C. In this case, the cooling water pump 61 is provided at the left end part of the cam shaft 60 and outside the cam sprocket 60a. Accordingly, the cooling water pump 61 is shifted largely to the left side, so that it greatly contributes to improvement in balance in weight.

Moreover, an ignition coil 62 and the reservoir tank 36 are shifted to the left side from the center line of the vehicle body C. This also allows the balance in weight to be improved.

Moreover, the lateral gusset 35 is fixed to the inner wall surfaces of the left and right tank rails 3 and parts of the tank rails 3, which have the rigidity improved by means of the lateral gusset 35, are connected to each other by the front cross member 50. In view of this point, the supporting rigidity of the engine can be also improved.

In addition, the lateral gusset 35 and the front cross member 50 are arranged within a dimension of the height of the tank rail 3 so as to be different in location in vertical direction. Accordingly, providing the lateral gusset 35 does not cause a complicated connecting structure of the front cross member 50.

In the embodiment, a case is described in which the cylinder head 24, which forms a component of the cylinder part, is directly mounted to the body frame 1. In the invention, however, the cylinder block 23 or the head cover 25, which is another component of the cylinder part, may be directly mounted to the body frame 1. Further, the side wall of the cylinder part may be directly mounted to the body frame although the rear wall of the cylinder part is mounted to the body frame in the embodiment. Moreover, the boss part may be provided outside one or two brackets, of course, although the upper boss part 24a is provided between the left and right brackets 53.

In the embodiment, a case is described in which the cooling water pump is provided coaxially at the other side end of the cam shaft. The cooling water pump in the invention, however, may be provided in a place other than the above, in a crank case, for example, of course.

The invention claimed is:

1. A motorcycle comprising:
a body frame and an engine mounted to the body frame, the body frame including:
left and right frame members spaced apart in a motorcycle width direction;
a cross member arranged to connect the left and right frame members; and
a bracket connected to the cross member; wherein
a cylinder part of the engine is directly mounted to the bracket; and
an overlapping portion of the cylinder part overlaps with the left and right frame members in a side view of the motorcycle, and the overlapping portion is directly mounted to the bracket.

2. The motorcycle according to claim 1, wherein a top end of the cylinder part is directly mounted to the bracket.

3. The motorcycle according to claim 1, wherein the bracket includes left and right brackets connected to the cross member with a space between the left and right brackets in the motorcycle width direction.

4. The motorcycle according to claim 3, wherein the cylinder part includes a boss arranged between the left and right brackets and mounted directly to the left and right brackets.

5. A motorcycle comprising:
a body frame and an engine mounted to the body frame, the body frame including:
left and right frame members spaced apart in a motorcycle width direction;
a cross member arranged to connect the left and right frame members; and
a bracket connected to the cross member; wherein
a cylinder part of the engine is directly mounted to the bracket;
the bracket includes left and right brackets connected to the cross member with a space between the left and right brackets in the motorcycle width direction;
the cylinder part is connected to the left and right brackets by a fastening bolt extending in the motorcycle width direction at a location overlapping with the left and right frame members in a side view of the motorcycle; and
a distance between the left frame member and the left bracket is different from a distance between the right frame member and the right bracket.

6. A motorcycle comprising:
a body frame and an engine mounted to the body frame, the body frame including:
left and right frame members spaced apart in a motorcycle width direction;
a cross member arranged to connect the left and right frame members; and
a bracket connected to the cross member; wherein
a cylinder part of the engine is directly mounted to the bracket;
a distance between the left and right frame members widens in the motorcycle width direction as the left and right frame members extend rearward from a head pipe supporting a front fork;
the left and right frame members are provided with left and right reinforcing members that extend in an axial direction along the left and right frame members and rearward from the head pipe to a location adjacent where the left and right frame members are widened outward in the motorcycle width direction; and
the cross member is connected to the left and right frame members in a vicinity of the reinforcing members of the left and right frame members.

7. The motorcycle according to claim 6, wherein the cross member and the left and right reinforcing members are located between a top and a bottom of the left and right frame members in a height dimension of the motorcycle, and the cross member and the left and right frame members are mounted to the left and right frame members at different heights.

8. A motorcycle comprising:
a body frame and an engine mounted to the body frame, the body frame including:
left and right frame members spaced apart in a motorcycle width direction;
a cross member arranged to connect the left and right frame members; and
a bracket connected to the cross member; wherein
a cylinder part of the engine is directly mounted to the bracket;
the engine is mounted to the bracket such that a cylinder axis is shifted to a first side in the motorcycle width direction from a center line of the body frame; and
at least a portion of a component of the engine or a component mounted to the motorcycle is provided on a second side in the motorcycle width direction opposite of the first side with respect to the center line of the body frame.

9. The motorcycle according to claim 8, wherein the component of the engine includes a cam shaft driving mechanism including:

a crank shaft side sprocket and a cam shaft side sprocket provided on the second side in the motorcycle width direction with respect to the center line of the body frame; and a chain wound around the cam shaft side sprocket and the crank shaft side sprocket; wherein the cam shaft driving mechanism is arranged to pass through a chain room location on the second side in the motorcycle width direction with respect to the center line of the body frame.

10. The motorcycle according to claim 8, wherein the component of the engine includes a cooling water pump provided on the second side in the motorcycle width direction with respect to the center line of the body frame.

11. The motorcycle according to claim 10, wherein the cooling water pump is provided coaxially with a cam shaft.

12. The motorcycle according to claim 8, wherein the component mounted to the motorcycle includes an ignition coil mounted to a coil bracket provided on the cross member and shifted towards the second side in the motorcycle width direction with respect to the center line of the body frame.

* * * * *